(12) United States Patent
Kudo et al.

(10) Patent No.: US 8,202,381 B2
(45) Date of Patent: Jun. 19, 2012

(54) RADIAL TIRE AND METHOD OF MANUFACTURING THE SAME

(75) Inventors: Shigeo Kudo, Osaka (JP); Tetsuo Tatara, Osaka (JP); Osamu Fujiki, Osaka (JP)

(73) Assignee: Toyo Tire & Rubber Co., Ltd., Osaka-shi, Osaka (JP)

( * ) Notice: Subject to any disclaimer, the term of this patent is extended or adjusted under 35 U.S.C. 154(b) by 747 days.

(21) Appl. No.: 12/161,424

(22) PCT Filed: Jan. 20, 2006

(86) PCT No.: PCT/JP2006/300850
§ 371 (c)(1),
(2), (4) Date: Apr. 3, 2009

(87) PCT Pub. No.: WO2007/083387
PCT Pub. Date: Jul. 26, 2007

(65) Prior Publication Data
US 2010/0126649 A1    May 27, 2010

(51) Int. Cl.
*B60C 9/00* (2006.01)
*B60C 9/02* (2006.01)
*B60C 9/04* (2006.01)
*B60C 9/10* (2006.01)

(52) U.S. Cl. ............ 156/123; 156/110.1; 156/117; 152/536; 152/548; 152/556; 152/558; 152/562; 152/564

(58) Field of Classification Search .......... 152/536, 152/548, 556, 558, 562, 564; 156/110.1, 156/117, 123
See application file for complete search history.

(56) References Cited

U.S. PATENT DOCUMENTS

| 1,453,865 | A |   | 5/1923  | Dickinson |
|-----------|---|---|---------|-----------|
| 4,484,966 | A | * | 11/1984 | Kawamoto ............ 156/126 |
| 6,913,058 | B1 |  | 7/2005  | Takagi |

FOREIGN PATENT DOCUMENTS

| EP | 0356159      | * | 2/1990  |
|----|--------------|---|---------|
| JP | 10-151910 A  |   | 6/1998  |
| JP | 2001-145961 A1 |  | 5/2001  |
| JP | 2001-322403 A |   | 11/2001 |
| JP | 2004-122626 A |   | 4/2004  |
| JP | 2004-142451 A |   | 5/2004  |
| JP | 2004-175157 A |   | 6/2004  |
| JP | 2004-322732 A |   | 11/2004 |
| JP | 2004-330566 A |   | 11/2004 |

OTHER PUBLICATIONS

International Search Report of PCT/JP2006/300850; date of mailing Apr. 11, 2006.

* cited by examiner

*Primary Examiner* — Khanh P Nguyen
*Assistant Examiner* — Carson Gross
(74) *Attorney, Agent, or Firm* — Westerman, Hattori, Daniels & Adrian, LLP

(57) ABSTRACT

The invention provides a radial tire, in which a single rubber coated cord (C1) is used to form a carcass layer (1) without generating any material jointed portion and which is favorable in weight balance, external appearance, and quality and excellent in productivity, the carcass layer (1) is formed from at least one cord row layer (11A) formed by cutting a rubber coated cord (C1), which is formed to make an external shape of a cross section elliptical, one by one, to align and bond the same in a tire circumference direction, and the cord row layer is jointed only in a single location on a tire circumference to generate little overlap.

4 Claims, 6 Drawing Sheets

FIG. 10
FIG. 11
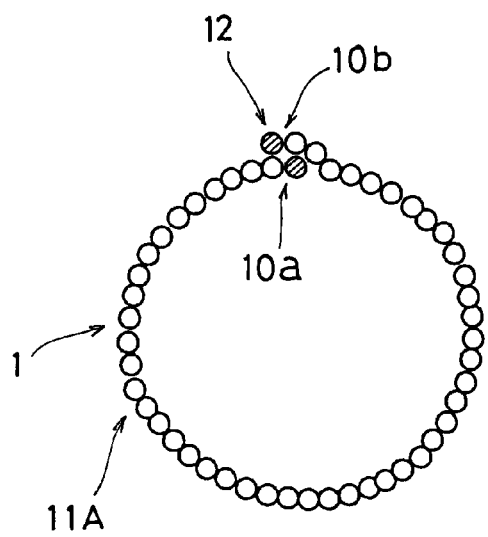
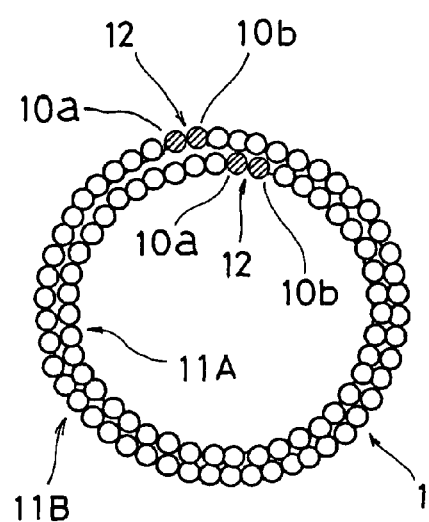
FIG. 12
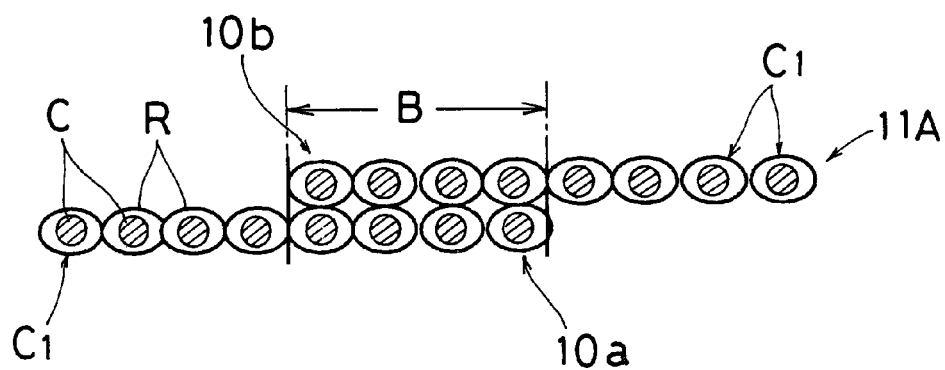

RADIAL TIRE AND METHOD OF MANUFACTURING THE SAME

TECHNICAL FIELD

The present invention relates to a radial tire having a carcass layer, of which cords are directed in a radial direction, and a method of manufacturing the same.

BACKGROUND ART

Generally, a radial tire is formed from a plurality of tire constituent members. For example, as shown in FIG. 13, a tire T comprises rubber members such as an inner liner 2, a tread 3, side walls 4, rim strips 5, etc., and tire reinforcement members such as a carcass layer 1 containing cords made of fabric and metal, a belt layer 7, etc. The reference numeral 8 in the figure denotes a bead part including a bead core 9.

Conventionally, the carcass layer 1 comprises a lengthy strip-shaped carcass material formed by using a so-called cord woven fabric woven by using cords made of synthetic fiber, which serve as a core material, as warp and coarsely driving thin wefts, which serve as coupling, every necessary intervals in a warp direction, having rubber topping the cord woven fabric in a calendar process, cutting the semi-product to a predetermined width corresponding to a width of the carcass layer in the next process, and sequentially jointing the cut materials together in a transverse direction (width direction) to the cords, the carcass material is ordinarily wound in a rolled manner to be stocked, and the carcass material is transferred to a tire building process to be cut to a necessary length for building to be used.

However, material jointed portions of the carcass material appear in a plurality of locations in addition to a jointed portion in a single location in building on the carcass layer of a tire built by using the carcass material. Besides, since the material jointed portions and the jointed portion generated in building do not appear regularly but randomly on a tire circumference, there is a fear of making the weight balance worse, and since the jointed portions appear randomly, measures therefor are difficult. Also, due to the presence of the plurality of jointed portions, irregularities appear on tire side portions to cause a fear of degrading the external appearance and quality thereof.

Further, the conventional method requires a wide area for stock of a carcass material and also requires personnel for conveyance of the carcass material or the like, so that it is problematic in productivity and disadvantageous for building of multi-kind small-lot production.

Therefore, in recent years, instead of using a carcass material composed of a cord woven fabric, it has been proposed to align and stick a single cord as adhesive-treated or rubberized zigzaggedly in sequentially shifted positions on a core having a similar shape to a shape of an inner peripheral surface of a product tire (for example, the following Patent Document 1 or 2).

However, the proposal involves a problem that a complex large-scale apparatus is needed for sticking of the cords and when the cords remain in a state of folded back at both side ends to be made continuous, there is caused a problem that the folded portions become bulky to damage the weight balance of a tire and the quantity of cord consumed is increased, or the like. On the contrary, in the case where after the cords are stuck, both side ends thereof are cut to a width dimension corresponding to a tire, the cut process is separately needed in tire building to cause a problem in productivity.

Further, it has been proposed as a further method to align a plurality of cords to top the same with rubber to form a strip-shaped carcass material having a relatively small width and to cut the carcass material to a predetermined length to align the cut pieces with cords directed in a transverse direction (width direction) to bond the same every interval in a tire circumferential direction to constitute a carcass layer (Patent Document 3).

However, the proposal involves a problem that since a multiplicity of jointed portions every cut material piece are present every interval in the tire circumferential direction, the weight balance of a tire is made worse and a multiplicity of irregularities are generated on tire side portions. Further, it is necessary to calculate and regulate the width of the strip-shaped carcass material according to a tire size, thus causing a problem in productivity.

Patent Document 1: JP-A-4-122626
Patent Document 2: JP-A-10-151910
Patent Document 3: JP-A-2004-175157

DISCLOSURE OF THE INVENTION

Problems that the Invention is to Solve

The invention has been thought of in order to solve the problem described above and has its object to provide a radial tire, in which a single rubber coated cord with rubber coated thereon is used to form a carcass layer without generating any material jointed portion and which is favorable in weight balance, external appearance, and quality and excellent in productivity, and a manufacturing method, by which the tire is obtained.

The invention has a feature in a radial tire comprising a carcass layer, of which reinforcement cords are directed in a radial direction, and wherein the carcass layer comprises at least one cord row layer formed by cutting a rubber coated cord, which is formed to make an external shape of a cross section elliptical, one by one aligned in a tire circumference direction to bond the same, and the cord row layer is jointed only in a single location on a tire circumference. In this case, a jointed portion, in building, on the cord row layer can be jointed so as to have no overlap, or can be jointed to have a slight overlap having an overlapping width of 4 mm or less.

With the radial tire, a jointed portion of the cord row layer of the carcass layer on a tire circumference is only one and the jointed portion has no overlap, or has a slight overlap of 4 mm or less, so that it is possible to maintain the weight balance favorable and little irregularities are generated on tire side portions by the jointed portion to maintain the external appearance and quality favorable.

Besides, since the cord row layer of the carcass layer comprises the rubber coated cords, of which an external shape of a cross section is elliptical, the alignment pitch of the cords can be changed and regulated in the range of a difference between major and minor axes of the ellipse by appropriately setting and regulating the ellipse of the cord in orientation. Therefore, changes and regulation of the alignment pitch according to an orientation of the ellipse make it possible to freely change the number of cord ends in some measure to set the same, thus enabling enlarging the freedom in tire design to readily obtain a tire of an intended configuration.

Also, preferably, the rubber coated cord as cut is bonded in an aligned configuration, in which a major axis direction of the ellipse is one of a direction parallel to, a direction inclined to, and a direction perpendicular to a tire circumference surface, or in an aligned configuration, in which two or more of the directions are mixed.

That is, in case of the rubber coated cords, of which an external shape of a cross section is elliptical, setting and regulation of a major axis direction of the ellipse make it possible to change and regulate the alignment pitch of the cords in the range of a difference between major and minor axes of the ellipse, so that changes and regulation of the alignment pitch according to an orientation of the ellipse make it possible to freely change and set the number of cord ends, thus enabling changing the alignment pitch and the number of the cords in a tire circumference direction while using, for example, the same rubber coated cords. Besides, such change can be readily made when the rubber coated cord is aligned.

Also, the invention has a feature in a method of manufacturing the radial tire, the method comprising using a rubber coated cord, which is formed to make an external shape of a cross section made elliptical, to cut the same to a length corresponding to a carcass width to align and bond the same in a tire circumference direction to form a cord row layer, jointing at least one cord row layer in a single location on a tire circumference to provide the carcass layer, regulating the ellipse in orientation when the rubber coated cord is to be aligned, and putting a major axis direction of the ellipse in a configuration of being aligned in at least one of a direction parallel to, a direction inclined to, and a direction perpendicular to a tire circumference surface to perform the bond. In particular, when the rubber coated cords are to be aligned, bond can be performed putting a major axis direction of the ellipse in an aligned configuration, in which two or more of a direction parallel to, a direction inclined to, and a direction perpendicular to a tire circumference surface are mixed.

Thereby, while the same rubber coated cord is used, setting and regulation of a major axis direction of the ellipse make it possible to readily change and regulate the alignment pitch of the cords and the number of cord ends, thus enabling readily manufacturing a tire of an intended configuration, which is favorable in quality of external appearance.

Effect of the Invention

With the radial tire and the method of manufacturing the same according to the invention, a wide area for stock is not required in manufacture unlike a radial tire and a manufacturing method, in which a conventional cord woven fabric is used, a tire circumference does not include any material jointed portion but includes only one jointed portion in building, and a double overlap of the jointed portion is not included, or only included very slightly, so that the weight balance becomes very favorable, no irregularities are generated on tire side portions, and the external appearance and quality are favorable to enable achieving a considerable improvement in commercial value.

In particular, by using a rubber coated cord, of which an external shape of a cross section is elliptical, and appropriately selecting an orientation of the ellipse (major axis direction) to align and bond the cord, it is possible to optionally and readily regulate the number of cord ends and a pitch at the time of alignment, so that it is possible to form a carcass layer of desired configuration.

BEST MODE FOR CARRYING OUT THE INVENTION

Subsequently, a best mode for carrying out the invention will be described on the basis of an embodiment shown in the drawings.

FIG. 1 is a view illustrating the outline of a state, in which a carcass layer of a radial tire according to the invention is aligned, FIGS. 2 and 3 are a side view illustrating in partially enlarged scale and a cross sectional view illustrating a rubber coated cord used in the carcass layer of a radial tire of the invention, and FIGS. 4 to 7 are views illustrating, in partially enlarged scale, a state, in which the rubber coated cords are aligned. FIG. 8 is a plan view schematically showing a method of aligning rubber coated cords and FIG. 9 is a plan view showing a state of development in a sheet-shaped manner. FIGS. 10 and 11 are views illustrating a carcass layer formed from the rubber coated cords. FIG. 12 is a view illustrating, in partially enlarged scale, a jointed portion.

The fundamental structure of a radial tire T according to the invention is like the radial tire T shown in FIG. 13 to comprise rubber members such as an inner liner 2, a tread 3, side walls 4, rim strips 5, etc., and reinforcement members such as a carcass layer 1 containing cords, a belt layer 7, etc., and in particular, in the invention, the carcass layer 1 containing cords in a radial direction is structured in the following manner.

The carcass layer 1 comprises a one-layered cord row layer formed by cutting a rubber coated cord C1 coated with rubber R one by one cord to align the same in a tire circumference direction to bond the same to a fabric cord C, which is mainly made of synthetic fiber such as nylon, polyester, etc., or natural fiber such as rayon, etc. and has a substantially circular cross section.

The rubber coated cord C1 is obtained by passing the fabric cord C through a rubber coating die (not shown), to which an extruder for a rubber material or the like is connected, and coating rubber on the surface thereof in a thin-filmy manner. At this time, by making a feed-side port shape of the rubber coating die elliptical, reshaping can be performed so that an external shape of a cross section of the coating rubber R is made elliptical as shown in FIG. 3, and the invention especially preferably uses a rubber coated cord C1, of which an external shape of a cross section is elliptical. While the oblateness of the ellipse, that is, a ratio of major axis and minor axis can be set appropriately, the major axis is preferably made 1.2 to 1.5 relative to the minor axis of 1. Also, the coating rubber R has a thickness of, for example, 0.2 to 0.5 mm.

While the rubber coated cord C1, of which an external shape of a cross section is elliptical, is bonded by aligning the coating rubber R to have the same layered in contact without any clearance, it is possible at this time to change and finely adjust the alignment pitch P of the cord according to an orientation of the ellipse.

Depending upon whether the rubber coated cords C1 are aligned with a major axis direction of the ellipse made parallel to a tire circumference surface, that is, a circumference of a building drum in a tire building process as shown in FIG. 4 (reference alignment), angularly aligned with a major axis direction of the ellipse inclined to the tire circumference surface as shown in FIG. 5 (angular alignment), and aligned with a major axis direction of the ellipse made perpendicular to the tire circumference surface as shown in FIG. 6 (perpendicular alignment), the alignment pitches P1, P2, P3 of the respective cords are different in the range of a difference between major and minor axes of the ellipse to be put in the relationship P1>P2>P3.

The rubber coated cords C1 can be aligned selecting one of the respective configurations of alignment in FIGS. 4 to 6, or can be aligned in a mixed state, in which two or more of the configurations of alignment are combined, as shown in FIG. 7, and it is possible to appropriately set and regulate the alignment pitch P of the cord according to selection of the configurations of alignment. In particular, in the case where a plurality of configurations of alignment are combined, it is possible to optionally set the number of and positions of cords in the respective configurations of alignment, thus enabling changing the alignment pitch P partially.

The rubber coated cord C1 is cut to a predetermined length corresponding to a transverse width of a carcass layer on a building drum (depiction of which is omitted) in a tire building process, during which respective lengths of the cord as cut are aligned and bonded on the building drum as described above, thus enabling forming a cord row layer, or is cut to the predetermined length on an alignment table or a conveyor (not shown), during which alignment and bonding are performed, thus enabling forming a sheet-shaped member being a cord row layer, but it is preferably and practically aligned and bonded as described above with the use of a separate alignment drum from the building drum and cut to form a sheet-shaped member being a cord row layer.

That is, as shown in FIG. 8, by using a rotatable alignment drum 15 having a circumference corresponding substantially to a transverse width of a carcass layer on a building drum and an alignment guide 16 including an elliptical-shaped guide hole permitting passage of the rubber coated cord C1 and made movable in parallel to an axis of the alignment drum 15, using the alignment guide 16 to spirally wind the rubber coated cord C1, of which an external shape of a cross section is elliptical, round the alignment drum 15 so as to align and layer the same in contact therewith without any clearance, and jointing adjacent cords together with the coating rubber R, a cylinder body 10 having an axial length L substantially corresponding to a circumference of a carcass layer on the building drum, or corresponding to a length including the axial length and a joint margin is formed. At this time, by controlling movements of the alignment guide 16 for pitch feed and turning thereof about the guide hole, the configurations of alignment are appropriately selected and winding is performed.

By cutting the cylinder body 10 in a width direction parallel to a drum axis after the winding, a sheet-shaped member 11, shown in FIG. 9, being a cord row layer, in which a multiplicity of cords as cut are aligned in parallel and bonded at a pitch corresponding to the configurations of alignment, that is, a member 11 as a carcass material can be obtained. Since the rubber coated cord C1 aligned in the member 11 is wound spirally round the alignment drum 15, an angle to the cut end does not exactly make 90° but the angular deviation is very small to correspond substantially to 90°. The reference numeral 17 in FIG. 8 denotes a cutter and 18 a slit serving as a guide when the cutter 17 performs cutting.

The radial tire T according to the invention is formed by sticking the sheet-shaped member 11, which is formed as described above, to the building drum in a tire building process with the cut end in a circumferential direction and with the respective cords as cut in a transverse direction, jointing both circumferential ends thereof, that is, a spiral winding beginning side end 10a and a spiral winding terminating side end 10b on the alignment drum 15 to form a carcass layer 1 comprising one cord row layer 11A as in FIG. 10, or a carcass layer 1 comprising two cord row layers 11A, 11B as in FIG. 11, and laminating other tire constituent members thereon.

In a jointed configuration of a jointed portion 12, the cord row layer 11A; 11A, 11B can be jointed with a predetermined slight overlap as in FIG. 10, and the cord row layers 11A, 11B can be jointed without any overlap or with little overlap as shown in FIG. 11. In case of two layers, the jointed portions 12 are preferably caused to get out of position mutually.

FIG. 12 shows, in enlarged scale, the jointed portion 12 with an overlap. Since an excessively large overlap is not generated and the strength of joint is not made small, an overlap of the jointed portion 12 especially preferably has an overlapping width B of 4 mm or less, but it is not limitative. For the jointed portion 12, jointing with an overlapping width is preferable in terms of strength preservation in case of the carcass layer 1 comprising one layer as shown in FIG. 10, and jointing with little overlap or butting (an overlapping width of 0 mm) with no overlap are preferable in terms of weight balance and prevention of generation of irregularities in case of the carcass layer 1 comprising two layers as shown in FIG. 11.

With the radial tire T formed in this manner, the respective cord row layers 11A; 11A, 11B of the carcass layer 1 on a tire circumference have only a single jointed portion 12 and the jointed portion do not overlap, or overlap very slightly, so that a favorable weight balance can be held and the jointed portion 12 generate little irregularities on a tire side to maintain the external appearance and quality thereof favorable.

Also, since the alignment pitch P of the cords can be changed and regulated in the range of a difference between major and minor axes of the ellipse according to the selection of a major axis direction and the combination for the ellipse of the rubber coated cord C1, changes and regulation of the alignment pitch according to an orientation of the ellipse make it possible to freely change the number of cord ends in some measure to set the same, thus enabling enlarging the tire design in freedom. For example, using the same rubber coated cord, it is possible to change cords in a circumferential direction with alignment pitch and number thereof. Besides, such change can be readily made when the rubber coated cords are aligned and joined.

In addition, a cord used for the rubber coated cord C1 is not limited to the use of fiber cord made of natural or synthetic fiber as in the embodiment but can be embodied with the use of a cord made of metallic cord in the same manner as described above.

INDUSTRIAL APPLICABILITY

The invention is preferably made use of in a radial tire comprising a carcass layer, of which cords are radially directed.

BRIEF DESCRIPTION OF THE DRAWINGS

FIG. 10 is a view illustrating an example of a carcass layer formed from the rubber coated cords.

FIG. 11 is a view illustrating a further example of a carcass layer formed from the rubber coated cords.

FIG. 12 is a view illustrating, in enlarged scale, a jointed portion.

DESCRIPTION OF REFERENCE NUMERALS AND SIGNS

Figure 1:
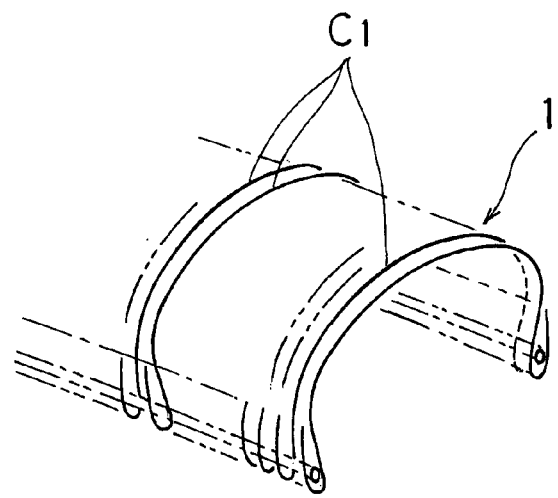
FIG. 1 is a view illustrating the outline of a state, in which a carcass layer of a radial tire according to the invention is aligned.
Figure 2:
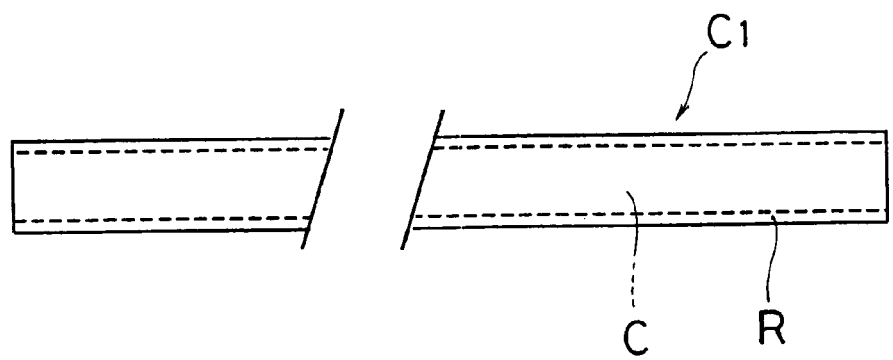
FIG. 2 is a side view illustrating, in partially enlarged scale, a rubber coated cord used in the carcass layer.
Figure 3:
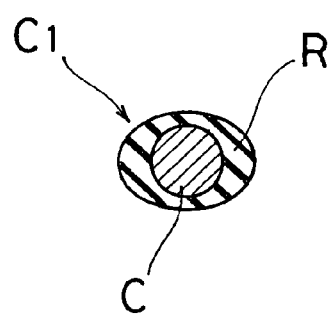
FIG. 3 is a cross sectional view illustrating the rubber coated cord.
Figure 4:
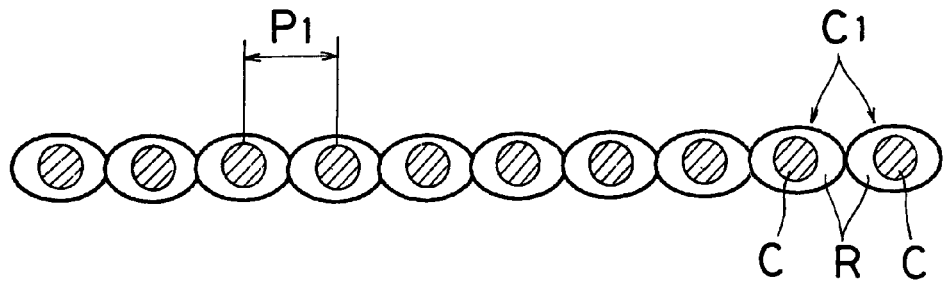
FIG. 4 is a view illustrating, in partially enlarged scale, an example of a state, in which rubber coated cords are aligned.
Figure 5:
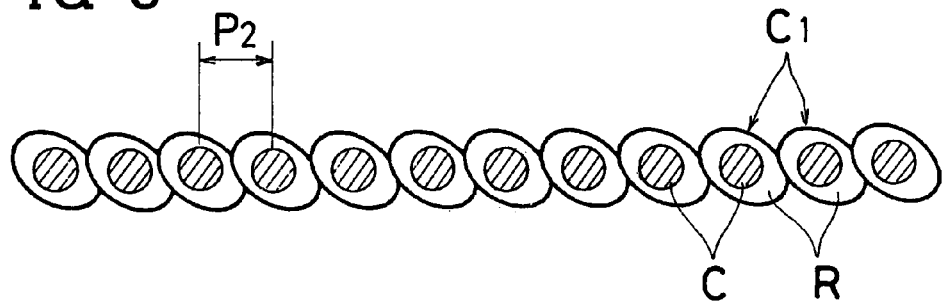
FIG. 5 is a view illustrating, in partially enlarged scale, a further example of a state, in which rubber coated cords are aligned.
Figure 6:
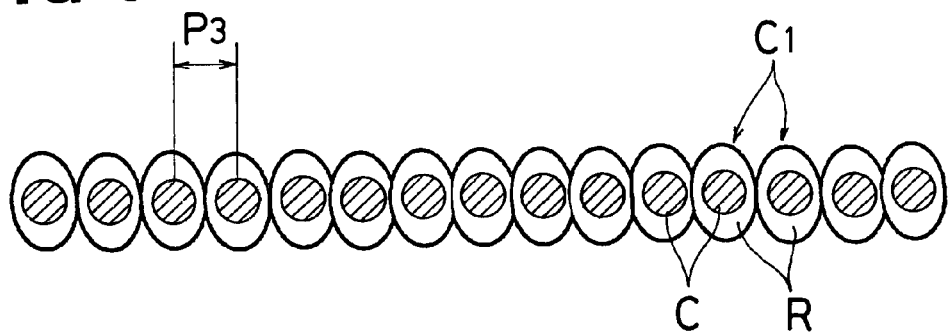
FIG. 6 is a view illustrating, in partially enlarged scale, a still further example of a state, in which rubber coated cords are aligned.
Figure 7:
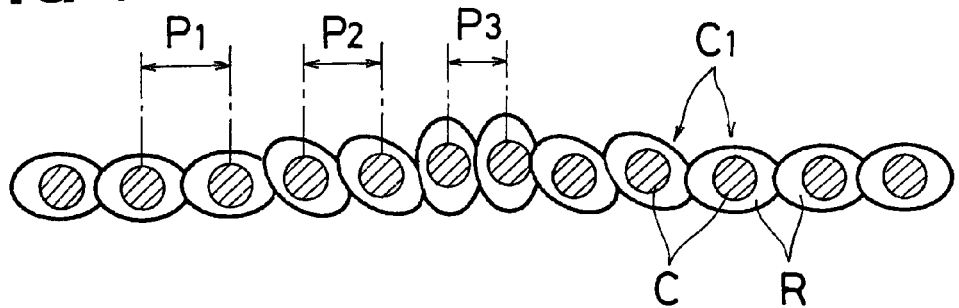
FIG. 7 is a view illustrating, in partially enlarged scale, a still further example of a state, in which rubber coated cords are aligned.
Figure 8:
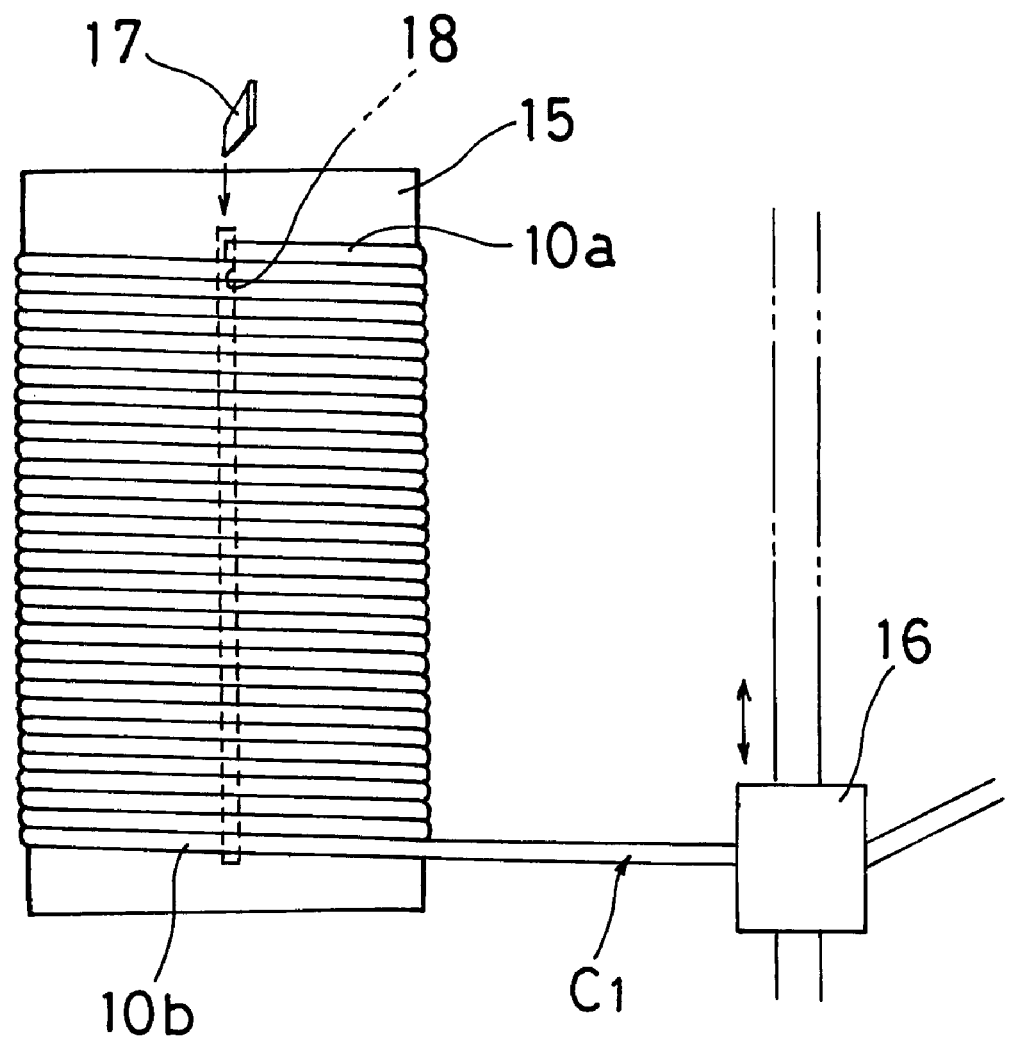
FIG. 8 is a plan view schematically showing a method of aligning rubber coated cords.
Figure 9:
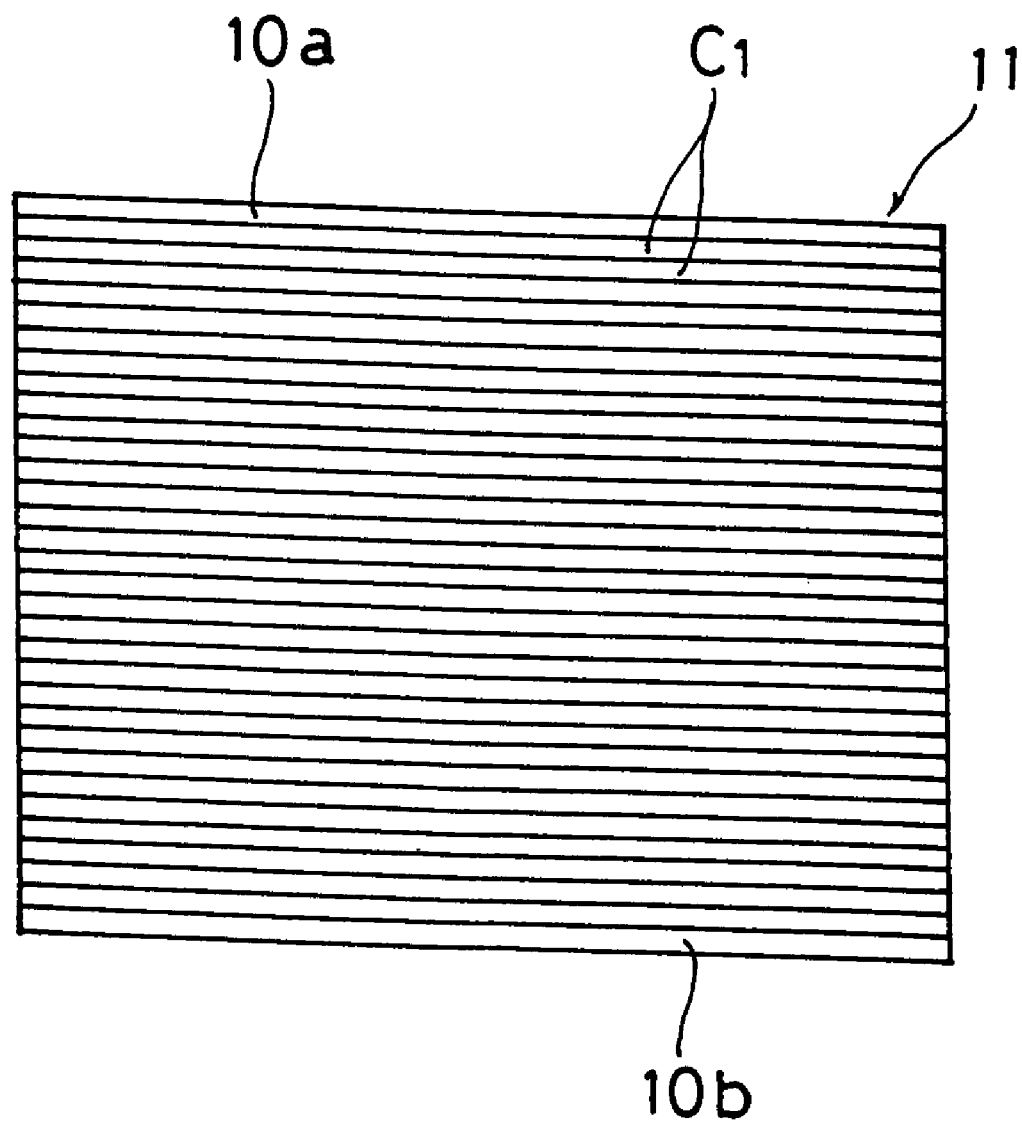
FIG. 9 is a plan view showing a state, in which a cylinder body is cut and developed in a sheet-shaped manner.
Figure 13:
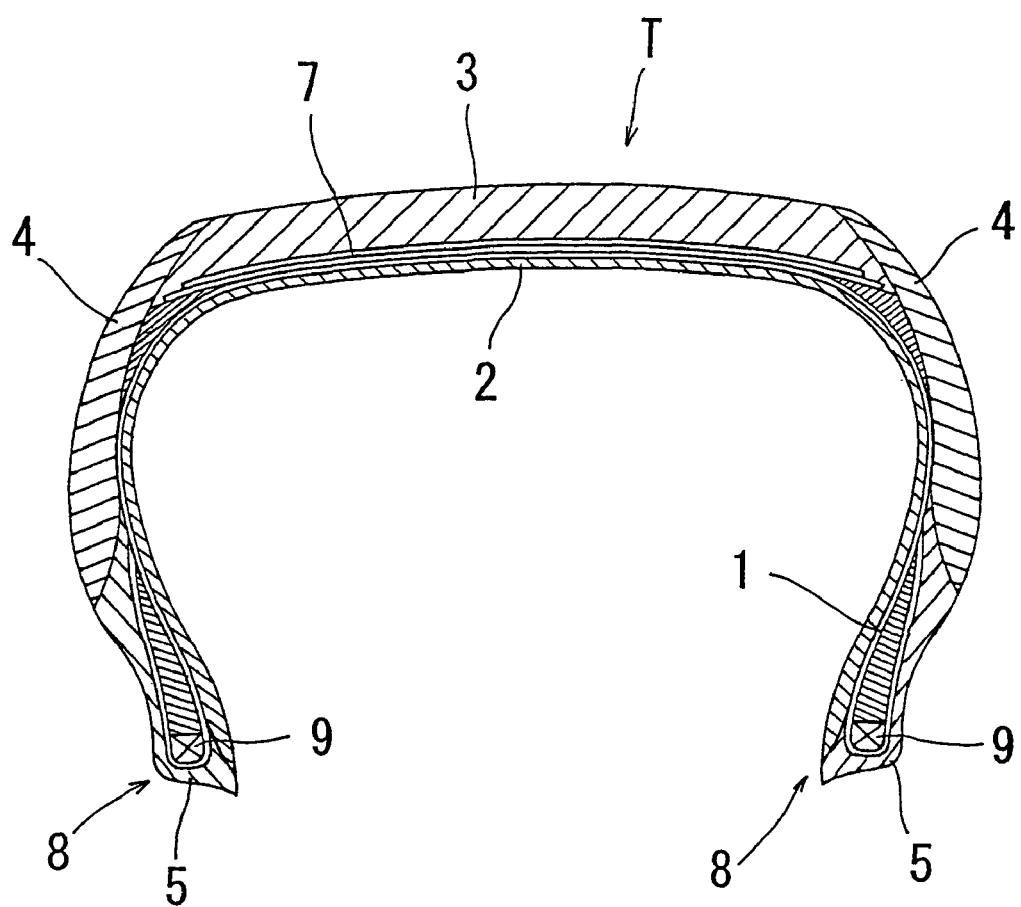
FIG. 13 is a cross sectional view illustrating the structure of a tire.

T: tire, 1: carcass layer, 2: inner liner, 3: tread, 4: side wall, 5: rim strip, 7: belt layer, 8: bead part, 9: bead core, 10: cylinder body, 10*a*: winding beginning side end, 10*b*: winding terminating side end, 11: sheet-shaped member, 11A; 11A, 11B: cord row layer, 12: jointed portion, 15: alignment drum, 16: alignment guide, 17: cutter, 18: cutting guide slit, B: overlapping width of jointed portion, C: fabric cord, C1: rubber coated cord, L: axial length of cylinder body, P (P1, P2, P3): alignment pitch

The invention claimed is:

1. A radial tire comprising a carcass layer, of which reinforcement cords are directed in a radial direction, and
wherein the carcass layer comprises at least one cord row layer formed of rows of cords, which have been cut out from a rubber coated cord having an elliptical cross section as to be separate with each other, and in which the rows of cords are bonded together to form an array in a tire circumference direction; the rows of cords are arranged such that major axes of the elliptical cross sections have at least two orientations with respect to tire circumference surface, among parallel, oblique and perpendicular orientations; and ends of the cord row layer is jointed only in a single location on a tire circumference.

2. The radial tire according to claim 1, wherein a jointed portion of the cord row layer in building is jointed so as to have no overlap.

3. The radial tire according to claim 1, wherein a jointed portion of the cord row layer in building is jointed to have a slight overlap having an overlapping width of 4 mm or less.

4. A method of manufacturing a radial tire having a carcass layer, of which reinforcement cords are directed in a radial direction, the method comprising:
preparing a rubber coated cord having an elliptical cross section;
cutting the reinforcement cords, each having a length matching a carcass width, from the rubber coated cord;
arranging and bonding together the reinforcement cords in an array in a tire circumference direction to form a cord row layer, in a manner that major axes of the elliptical cross sections have at least two orientations among parallel, oblique and perpendicular orientations with respect to tire circumference surface;
jointing ends of the at least one cord row layer in a single location on a tire circumference to provide the carcass layer.

* * * * *